(12) United States Patent
Schaedler et al.

(10) Patent No.: US 11,591,484 B1
(45) Date of Patent: Feb. 28, 2023

(54) RESIN FORMULATIONS FOR ADDITIVE MANUFACTURING OF METALS, AND METHODS OF MAKING AND USING THE SAME

(71) Applicant: HRL Laboratories, LLC, Malibu, CA (US)

(72) Inventors: Tobias A. Schaedler, Oak Park, CA (US); Phuong P. Bui, Thousand Oaks, CA (US); Zak C. Eckel, Thousand Oaks, CA (US); Jacob M. Hundley, Thousand Oaks, CA (US); Kayleigh A. Porter, Los Angeles, CA (US); John H. Martin, Oxnard, CA (US)

(73) Assignee: HRL Laboratories, LLC, Malibu, CA (US)

( * ) Notice: Subject to any disclaimer, the term of this patent is extended or adjusted under 35 U.S.C. 154(b) by 629 days.

(21) Appl. No.: 16/672,385

(22) Filed: Nov. 1, 2019

Related U.S. Application Data

(60) Provisional application No. 62/798,539, filed on Jan. 30, 2019.

(51) Int. Cl.

| | | |
|---|---|---|
| *C09D 11/101* | (2014.01) | |
| *C09D 4/00* | (2006.01) | |
| *C09D 5/33* | (2006.01) | |
| *B33Y 70/00* | (2020.01) | |
| *B33Y 10/00* | (2015.01) | |
| *B22F 3/24* | (2006.01) | |
| *B29C 64/106* | (2017.01) | |
| *B22F 10/00* | (2021.01) | |
| *B29K 505/08* | (2006.01) | |

(52) U.S. Cl.
CPC .............. *C09D 11/101* (2013.01); *B22F 3/24* (2013.01); *B22F 10/00* (2021.01); *B29C 64/106* (2017.08); *B33Y 10/00* (2014.12); *B33Y 70/00* (2014.12); *C09D 4/00* (2013.01); *C09D 5/004* (2013.01); *B22F 2003/248* (2013.01); *B22F 2301/15* (2013.01); *B29K 2505/08* (2013.01)

(58) Field of Classification Search
CPC ........ C09D 11/101; C09D 4/00; C09D 5/004; B33Y 10/00; B33Y 70/00; B29C 64/106; B22F 10/00; B22F 3/24; B22F 2003/248; B22F 2301/15; B29K 2505/08
See application file for complete search history.

(56) References Cited

U.S. PATENT DOCUMENTS

| | | | |
|---|---|---|---|
| 4,575,330 A | 3/1986 | Hull | |
| 6,117,612 A | 9/2000 | Halloran et al. | |
| 2018/0318922 A1* | 11/2018 | Valls Anglés | ........... C22C 19/03 |

FOREIGN PATENT DOCUMENTS

JP      2008050671 A      3/2008

OTHER PUBLICATIONS

Ellingham, "Reducibility of Oxides and Sulphides in Metallurgical Processes", J. Soc. Chem. Ind. (London), 63 (5): 125, 1944.
Czerniawski and Wojtczak, "Polymerizations of cobalt and nickel acrylate in dimethylfomnamide", Acta Polymerica, vol. 40, Issue 7, pp. 442-444, 1989.
Bartolo and Gaspar, Metal filled resin for stereolithography metal part:, CIRP Annals vol. 57, Issue 1, 2008, pp. 235-238.
Vyatskikh et al., "Additive manufacturing of 3D nano-architected metals", Nature Communications (2018) 9:593.

\* cited by examiner

*Primary Examiner* — Edward J Cain
(74) *Attorney, Agent, or Firm* — O'Connor & Company; Ryan P. O'Connor

(57) ABSTRACT

Some variations provide a composition for additive manufacturing (3D printing) of metals, comprising: from 10 vol % to 70 vol % of a photocurable liquid resin; from 10 vol % to 70 vol % of metal or metal alloy particles, optionally configured with a photoreflective surface; and from 0.01 vol % to 10 vol % of a photoinitiator. Other variations provide a composition for additive manufacturing of metals, comprising: from 1 vol % to 70 vol % of a photocurable liquid resin; from 0.1 vol % to 98 vol % of an organometallic compound containing a first metal; from 1 vol % to 70 vol % of metal or metal alloy particles containing a second metal (which may be the same as or different than the first metal); and from 0.01 vol % to 10 vol % of a photoinitiator. Many examples of metals, photocurable resins, organometallic compounds, photoinitiators, and optional additives are disclosed, and methods of making and using the composition are described.

49 Claims, 4 Drawing Sheets

RESIN FORMULATIONS FOR ADDITIVE MANUFACTURING OF METALS, AND METHODS OF MAKING AND USING THE SAME

PRIORITY DATA

This patent application is a non-provisional application with priority to U.S. Provisional Patent App. No. 62/798,539, filed on Jan. 30, 2019, which is hereby incorporated by reference herein.

FIELD OF THE INVENTION

The present invention generally relates to resin compositions for additive manufacturing of metallic components, and methods of making and using such resin compositions in 3D-printing processes.

BACKGROUND OF THE INVENTION

Metallic materials offer combined properties, such as strength, toughness, temperature capability, chemical resistance, and durability that cannot be achieved by a polymer or ceramic.

Metal-based additive manufacturing, or three-dimensional (3D) printing, has applications in many industries, including the aerospace and automotive industries. Building up metal components layer by layer increases design freedom and manufacturing flexibility, thereby enabling complex geometries while eliminating traditional economy-of-scale constraints.

A stereolithography technique provides a method to build a 3D polymer microstructure in a layer-by-layer process. This process usually involves a platform (e.g., substrate) that is lowered into a photomonomer bath in discrete steps. At each layer, a laser is used to scan over the area of the photomonomer that is to be cured (i.e., polymerized) for that particular layer. Once the layer is cured, the platform is lowered by a specific amount, determined by the processing parameters and desired feature/surface resolution, and the process is repeated until the complete 3D structure is created. One example of such a stereolithography technique is disclosed in U.S. Pat. No. 4,575,330 issued Mar. 11, 1986 to Hull et al. Modifications to the stereolithography technique have been developed to improve the polymer resolution by using laser optics and special resin formulations. Also, modifications have been made to decrease the fabrication time of the 3D polymer structure by using a dynamic pattern generator to cure an entire layer at once. One example of such modification is disclosed in Bertsch et al., "Microstereolithography: A Review," Materials Research Society Symposium Proceedings, Vol. 758, 2003. Another advancement to the standard stereolithography technique includes a two-photon polymerization process, as disclosed in Sun et al., "Two-Photon Polymerization And 3D Lithographic Microfabrication," Advances in Polymer Science, Vol. 170, 169-273, 2004.

It would be desirable to perform additive manufacturing of metal parts by stereolithography (SLA), digital light projection (DLP), and other UV-based approaches that generally offer low cost, high resolution, and high speed. For example, a standard 3D printer for selective laser melting (SLM) of metal parts costs about $700,000. Desktop stereolithography printers, on the other hand, are available for about $5,000. It takes about 100 seconds to print a 40-micron thin layer by SLM, whereas a similar layer can be printed in 10 seconds by DLP. Furthermore, the minimum feature size possible by SLM is on the order of 100 microns, whereas with micro-SLA, feature sizes of less than 10 microns can be easily realized. Previously, only polymer parts could be printed with SLA and DLP approaches (as explained above) and, only recently, ceramic parts. Metallic parts so far have not been demonstrated with these preferred approaches.

In U.S. Pat. No. 6,117,612 issued Sep. 12, 2000 to Halloran et al. for "Stereolithography resin for rapid prototyping of ceramics and metals," resins are filled with ceramic particles only and printed molds are used for casting of metals. In JP2008050671 by Fuwa for "Metal powder for metal stereo lithography," metal particles are used as powder and are not suspended in a resin. In Bartolo and Gaspar, "Metal filled resin for stereolithography metal part" CIRP Annals Volume 57, Issue 1, 2008, Pages 235-238, the authors described adding cobalt and tungsten carbide to an organic acrylate resin. However, no reduction to practice was realized. In Czerniawski and Wojtczak, "Polymerizations of cobalt and nickel acrylate in dimethylformamide" Acta Polymerica, Volume 40, Issue 7, Pages 442-444, 1989, the authors demonstrated polymerization but not 3D printing. In Vyatskikh et al., "Additive manufacturing of 3D nano-architected metals" NATURE COMMUNICATIONS (2018) 9:593, the authors demonstrated two-photon lithography of a UV-curable resin containing nickel acrylate, but with no metal particles in the resin.

Direct, free-form 3D printing of metal-containing resins, which can be converted to metallic components, is sought. The metal-containing resins (monomers and polymers) preferably maintain chemical and physical properties such that they can be printed using stereolithography and other UV-based approaches into complex 3D shapes, which then may be thermally treated to remove organic material, thereby fabricating 3D-printed metallic components using low-cost processes and equipment.

SUMMARY OF THE INVENTION

The present invention addresses the aforementioned needs in the art, as will now be summarized and then further described in detail below.

Some variations provide a composition for additive manufacturing (3D printing) of metals, the composition comprising:
  (a) from about 10 vol % to about 70 vol % of a photocurable liquid resin (in monomer, oligomer, and/or polymer form);
  (b) from about 10 vol % to about 70 vol % of metal or metal alloy particles, wherein the metal or metal alloy particles are optionally configured with a photoreflective surface (e.g., a UV-reflective surface); and
  (c) from about 0.01 vol % to about 10 vol % of a photoinitiator.

In some embodiments, the photocurable liquid resin contains one or more acrylates, methacrylates, thiols, vinyls, allyls, alkenes, alkynyls, epoxies, combinations thereof, or reaction products thereof. In certain embodiments, the photocurable liquid resin contains a component containing a C=X and/or C≡X bond, wherein X is selected from C, S, O, and/or N.

In some embodiments, the photocurable liquid resin contains an organic resin component in a concentration from about 10 vol % to about 80 vol % of the photocurable liquid resin, for example. The organic resin component may be selected from the group consisting of acrylic acid, poly (ethylene-co-methacrylic acid), poly(ethylene-co-acrylic acid), 1,6-hexanediol diacrylate, pentaerythritol triacrylate, pentaerythritol tetraacrylate, pentaerythritol tetrakis(3-mercaptopropionate), trimethylolpropane tris(3-mercaptopropionate), 1,3,5-triallyl-1,3,5-triazine-2, 4,6(1H,3H,5H)-trione, and combinations thereof, for example.

In some embodiments, the photocurable liquid resin contains an organometallic resin component in a concentration from about 10 vol % to about 50 vol % of the photocurable liquid resin, for example. The organometallic resin component may be selected from metal-coordination monomers, oligomers, polymers, or combinations thereof.

In some embodiments, the organometallic resin component is selected from the group consisting of nickel acrylate, cobalt acrylate, copper acrylate, iron acrylate, zinc acrylate, aluminum acrylate, nickel methacrylate, cobalt methacrylate, copper methacrylate, iron methacrylate, zinc methacrylate, aluminum methacrylate, and combinations thereof, for example. Alternatively, or additionally, the organometallic resin component is selected from the group consisting of potassium trichloro(ethene)platinate, potassium trichloro(ethene)palladiumate, potassium trichloro(ethene)nickelate, bis(cyclooctadiene)nickel(0), iron cyclooctatetraene, transition-metal fullerene complexes, metal acetylacetonates, and combinations thereof.

In some embodiments, the metal or metal alloy particles are surface-polished to provide the photoreflective surface. In other embodiments, or additionally, the metal or metal alloy particles are coated with a photoreflective coating that has a surface composition different than the composition of the metal or metal alloy particles. The surface composition of the photoreflective coating may include a metal selected from the group consisting of Ni, Cu, Co, Fe, and combinations thereof, for example. The photoreflective coating may be a pure metal or a metal alloy. The photoreflective coating may be applied by electroless plating or chemical vapor deposition, for example. The thickness of the photoreflective coating may be from about 100 nanometers to about 2000 nanometers, for example.

In some embodiments, the metal or metal alloy particles are characterized by an average effective diameter from about 0.5 microns to about 20 microns. The metal or metal alloy particles may be in the form of spheres, whiskers, rods, fibers, platelets, or a combination thereof, for example. In some preferred embodiments, the metal or metal alloy particles are characterized by an average aspect ratio greater than 1.

In certain embodiments, the composition for additive manufacturing of metals comprises from about 5 vol % to about 60 vol % of metal or metal alloy particles, wherein the metal or metal alloy particles are characterized by an average effective diameter from about 0.5 microns to about 20 microns, wherein the thickness of the photoreflective coating is from about 100 nanometers to about 2000 nanometers, and wherein the surface composition of the photoreflective coating includes a metal selected from the group consisting of Ni, Cu, Co, Fe, and combinations thereof.

In various embodiments, the metal or metal alloy particles contain a metal selected from the group consisting of Ni, Cu, Co, Fe, Mn, V, Cr, Ti, Al, Zn, Y, Zr, Nb, Mo, Ru, Rh, Pd, Ag, Cd, La, Hf, Ta, W, Re, Os, Ir, Pt, La, Ce, Pr, Nd, Sm, Eu, Gd, Tb, Dy, Ho, Er, Tm, Yb, Lu, and combinations thereof.

In some embodiments, the metal or metal alloy particles contain a metal alloy selected from the group consisting of aluminum alloys, stainless steels, high-temperature steels, nickel alloys comprising Ni, Al, and Cr with more than 3 wt % Al and a Cr/Al ratio less than 4, nickel alloys comprising Ni, Al, and Cr with more than 10 wt % Cr and a Cr/Al ratio greater than 4, and combinations thereof.

In some compositions, the photoinitiator is present in a concentration from about 0.1 vol % to about 5 vol %. The photoinitiator may be selected from the group consisting of 2,2-dimethoxy-2-phenylacetophenone; 2-hydroxy-2-methylpropiophenone; camphorquinone; bis(2,4,6-trimethylbenzoyl)-phenylphosphineoxide; diphenyl(2,4,6-trimethylbenzoyl) phosphine oxide; benzophenone; azobisisobutyronitrile; peroxides; benzoyl peroxide; thioxanthones; and combinations thereof.

Some compositions further comprise from about 0.01 vol % to about 25 vol % of a UV reflector containing, for example, a metal selected from the group consisting of Al, Co, Cu, Ag, Au, Ca, In, K, Li, Mg, Na, Rb, Zn, and combinations thereof.

Some compositions further comprise from about 1 vol % to about 50 vol % of a solvent, such as a solvent selected from the group consisting of isopropyl alcohol, ethanol, methoxyethanol, dimethylformamide, ethyl acetate, dichloromethane, dimethylsulfoxide, acetonitrile, chloroform, tetrahydrofuran, and combinations thereof.

Some compositions further comprise from about 0.01 vol % to about 5 vol % of a surfactant.

Some compositions further comprise from about 0.01 vol % to about 25 vol % of a sinter aid.

Some compositions further comprise from about 0.01 vol % to about 10 vol % of a 3D-printing resolution agent.

Other variations of the invention provide a composition for additive manufacturing (3D printing) of metals, the composition comprising:
  (a) from about 1 vol % to about 70 vol % of a photocurable liquid resin;
  (b) from about 0.1 vol % to about 98 vol % of an organometallic compound containing a first metal;
  (c) from about 1 vol % to about 70 vol % of metal or metal alloy particles, wherein the metal or metal alloy particles contain a second metal; and
  (d) from about 0.01 vol % to about 10 vol % of a photoinitiator.

In some embodiments, the photocurable liquid resin contains one or more acrylates, methacrylates, thiols, vinyls, allyls, alkenes, alkynyls, epoxies, combinations thereof, or reaction products thereof. In certain embodiments, the photocurable liquid resin contains a component containing a C=X and/or C≡X bond, wherein X is selected from C, S, O, and/or N.

In some embodiments, the photocurable liquid resin contains a resin organic component selected from the group consisting of acrylic acid, poly(ethylene-co-methacrylic acid), poly(ethylene-co-acrylic acid), 1,6-hexanediol diacrylate, pentaerythritol triacrylate, pentaerythritol tetraacrylate, pentaerythritol tetrakis(3-mercaptopropionate), trimethylolpropane tris(3-mercaptopropionate), 1,3,5-triallyl-1,3,5-triazine-2, 4,6(1H,3H,5H)-trione, and combinations thereof In some embodiments, the organometallic compound is selected from the group consisting of metal-organic salts, metal-organic chelates, metal-organic frameworks with one or more organic ligands, metal-coordination monomers, metal-coordination oligomers, metal-coordination polymers, and combinations thereof. The organometallic compound contains at least the first metal, and optionally additional metals. The first metal may be the same as the second metal (contained in the metal or metal alloy particles), or the first metal may be different than the second metal. The organometallic compound itself is optionally photocurable.

In some embodiments, the organometallic compound is a metal-organic salt selected from the group consisting of nickel nitrate, cobalt nitrate, copper nitrate, iron nitrate, aluminum nitrate, nickel chloride, cobalt chloride, copper chloride, iron chloride, aluminum chloride, nickel bromide, cobalt bromide, copper bromide, iron bromide, aluminum bromide, and combinations thereof.

In some embodiments, the organometallic compound is a metal-organic chelate selected from the group consisting of nickel acrylate, cobalt acrylate, copper acrylate, iron acrylate, zinc acrylate, aluminum acrylate, nickel methacrylate, cobalt methacrylate, copper methacrylate, iron methacrylate, zinc methacrylate, aluminum methacrylate, and combinations thereof.

In some embodiments, the organometallic compound contains an organic component selected from the group consisting of acrylic acid, poly(ethylene-co-methacrylic acid), poly(ethylene-co-acrylic acid), 1,6-hexanediol diacrylate, pentaerythritol triacrylate, pentaerythritol tetraacrylate, pentaerythritol tetrakis(3-mercaptopropionate), trimethylolpropane tris(3-mercaptopropionate), and combinations thereof. In these or other embodiments, the organometallic compound contains a metal or metal-containing component selected from the group consisting of zinc, nickel, cobalt, copper, iron, aluminum, zinc hydroxide, nickel hydroxide, cobalt hydroxide, copper hydroxide, iron hydroxide, aluminum hydroxide, and combinations thereof.

In some embodiments, the metal or metal alloy particles are configured with a photoreflective surface. For example, the metal or metal alloy particles may be surface-polished to provide the photoreflective surface. Alternatively, or additionally, the metal or metal alloy particles may be coated with a photoreflective coating that has a surface composition different than the composition of the metal or metal alloy particles, wherein the surface composition of the photoreflective coating optionally includes a metal selected from the group consisting of Ni, Cu, Co, Fe, and combinations thereof. The thickness of the photoreflective coating, when present, may be from about 100 nanometers to about 2000 nanometers, for example.

In some embodiments, the metal or metal alloy particles are characterized by an average effective diameter from about 0.5 microns to about 20 microns, and the metal or metal alloy particles are optionally characterized by an average aspect ratio greater than 1.

In various embodiments, the metal or metal alloy particles contain a metal selected from the group consisting of Ni, Cu, Co, Fe, Mn, V, Cr, Ti, Al, Zn, Y, Zr, Nb, Mo, Ru, Rh, Pd, Ag, Cd, La, Hf, Ta, W, Re, Os, Ir, Pt, La, Ce, Pr, Nd, Sm, Eu, Gd, Tb, Dy, Ho, Er, Tm, Yb, Lu, and combinations thereof. In some embodiments, the metal or metal alloy particles contain at least 10 wt % of nickel, cobalt, copper, iron, aluminum, or a combination thereof.

In some compositions, the photoinitiator is selected from the group consisting of 2,2-dimethoxy-2-phenylacetophenone; 2-hydroxy-2-methylpropiophenone; camphorquinone; bis(2,4,6-trimethylbenzoyl)-phenylphosphineoxide; diphenyl(2,4,6-trimethylbenzoyl) phosphine oxide; benzophenone; azobisisobutyronitrile; peroxides; benzoyl peroxide; thioxanthones; and combinations thereof.

Some compositions further comprise from about 0.01 vol % to about 25 vol % of a UV reflector containing a metal selected from the group consisting of Al, Co, Cu, Ag, Au, Ca, In, K, Li, Mg, Na, Rb, Zn, and combinations thereof.

Some compositions further comprise from about 1 vol % to about 50 vol % of a solvent selected from the group consisting of isopropyl alcohol, ethanol, methoxyethanol, dimethylformamide, ethyl acetate, dichloromethane, dimethylsulfoxide, acetonitrile, chloroform, tetrahydrofuran, and combinations thereof.

Some compositions further comprise from about 0.01 vol % to about 5 vol % of a surfactant.

Some compositions further comprise from about 0.01 vol % to about 25 vol % of a sinter aid.

Some compositions further comprise from about 0.01 vol % to about 10 vol % of a 3D-printing resolution agent.

Some variations of the invention provide a 3D-printed intermediate metallic component, the 3D-printed intermediate metallic component comprising:
(a) from about 1 vol % to about 70 vol % of a photocured resin;
(b) from about 0.1 vol % to about 98 vol % of an organometallic compound containing a first metal; and
(c) from about 1 vol % to about 70 vol % of a metal or metal alloy, wherein the metal or metal alloy contains a second metal.

Some variations provide a 3D-printed metallic component, the 3D-printed metallic component comprising:
(a) from about 0.1 vol % to about 99 vol % of a thermally treated (e.g., pyrolyzed) organometallic compound containing a first metal; and
(b) from about 0.1 vol % to about 99 vol % of a metal or metal alloy, wherein the metal or metal alloy contains a second metal.

The thermally treated (e.g., pyrolyzed) organometallic compound may or may not contain the organic, non-metal portion of the starting organometallic compound. In some embodiments, the thermally treated organometallic compound contains essentially no organic matter. In other embodiments, the thermally treated organometallic compound contains residual organic matter, or even an intentional amount of organic matter (e.g., forming a matrix phase for a composite).

In some 3D-printed metallic components, the first metal is the same as the second metal. In other 3D-printed metallic components, the first metal is different than the second metal.

In some embodiments, the 3D-printed metallic component further contains a polymer matrix. In these or other embodiments, the 3D-printed metallic component further contains a ceramic material.

The 3D-printed metallic component may be characterized by a feature size less than 20, 10, 5, 1, 0.5, or 0.1 microns.

Some embodiments provide a sintered structure containing a plurality of 3D-printed metallic components, each comprising (a) from about 0.1 vol % to about 99 vol % of a thermally treated (e.g., pyrolyzed) organometallic compound containing a first metal; and (b) from about 0.1 vol % to about 99 vol % of a metal or metal alloy, wherein the metal or metal alloy contains a second metal.

DETAILED DESCRIPTION OF EMBODIMENTS OF THE INVENTION

Figure 1:
FIG. 1 is a photograph of 3D-printed nickel-containing and polymer-containing green bars prior to debinding and sintering, in the Examples.

The compositions, formulations, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. Unless otherwise stated, elements are denoted by their standard symbols, e.g. H is hydrogen, C is carbon, N is nitrogen, O is oxygen, etc.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Variations of the present invention are premised on the realization that efficient stereolithography (SLA) and digital light projection (DLP) 3D printers and methods can be designed to additively manufacture metallic composite parts as well as pure-metal and metal-alloy parts. The use of SLA, DLP, or other UV-based approaches enables substantially lower cost, faster rate, and higher resolution compared to other metal-based additive manufacturing approaches, such as selective laser melting, electron beam melting, and binder jetting.

This invention, in some variations, provides starting compositions of a resin system that can be cured with light (e.g., UV light) and subsequently converted to a metallic material by a heat treatment. Methods are also described to additively manufacture metallic parts starting with the disclosed resin systems.

For example, metal acrylate salts such as nickel acrylate and similar molecules have photoreactivity (e.g., UV reactivity) and can be mixed with other photocurable organic monomers and metal particles to formulate a resin system that can be fed into a variety of commercially available 3D printers to additively manufacture a complex part. The as-printed part can then be heated to remove organic components, leaving behind the metallic component.

Embodiments of the invention may be broadly utilized in the following commercial applications, for example:

Low-cost, high-strength, and lightweight metallic composite exteriors (e.g., tails, wings, propellers, etc.)
Low-cost, non-structural metal parts such as latches and hinges for overhead bins
Small, non-fatigue critical or non-fracture critical structural metal parts for customization of rotorcraft (e.g., hooks, brackets, knobs, etc.)
Low-cost, high-strength, and lightweight metallic polymer composite exteriors
Low-cost customization of vehicle interior (e.g., knobs, handles, and decorative features)
Customized catalytic conversion structures
Organometallic materials for electronic components
Spare parts that can be printed in the field or on base
Low-cost repair and maintenance
Prototypes
Sporting goods
Household goods
Composite pipes and fittings The starting composition is a liquid photocurable resin that contains at least one metal, which may be included within the resin in various ways. In particular, by (a) including photoreactive monomers, oligomers, and/or polymers containing metal-organic ligands with the starting composition, (b) dissolving metal salts within the starting composition, and/or (c) suspending solid metal particles in the starting composition, the liquid photocurable resin can be printed into a polymer part containing metal ions and/or metallic particles. The part may then be heated to remove the organic resin, leaving behind the metal components which can in turn be optionally fused together by sintering at higher temperatures.

By "photocurable" it is meant that a composition may be cured (chemically reacted to oligomerize, polymerize, or form crosslinking bonds) using photons in the ultraviolet (UV) or visible light wavelengths, i.e. from about 10 nm to about 800 nm. In some embodiments, the photocurable composition is curable with light wavelengths from about 200 nm to about 500 nm, or from about 400 nm to about 800 nm. In certain embodiments, the photocurable composition is curable with a light wavelength of 365 nm and/or 405 nm.

In some embodiments, the volume fraction of metal in the liquid photocurable resin is preferably at least 10 vol %, more preferably at least 20 vol %, and most preferably at least 30 vol %, such as about, or at least about, 30 vol %, 35 vol %, 40 vol %, 45 vol %, 50 vol %, 55 vol %, 60 vol %, 65 vol %, 70 vol %, 75 vol %, or 80 vol %. In some embodiments, the volume fraction of metal in the liquid photocurable resin is in the range of 30 vol % to 70 vol %. A high concentration of metal in the starting resin—at least about 30 vol %—is desirable to prevent the intermediate metal—polymer part from falling apart when the polymer is removed, as well as to reduce shrinkage during debinding and sintering. On the other hand, in certain cases described later, highly porous metallic structures are produced in which the volume fraction of metal in the starting liquid photocurable resin may be as low as 1 vol %.

Concomitantly with high metal volume fraction in the resin, however, its viscosity is increased and the penetration depth of UV light or cure depth is decreased. Both effects hinder the 3D-printing process. The viscosity increase may be mitigated by adding viscosity-modifying additives, such as surfactants and/or dispersants. The decrease in cure depth may be counteracted by optimizing the particle size, particle surface functionality, autocatalytic nature of metal-organic resin molecules, and/or the photoinitiator. The UV light penetration or cure depth may be improved with a high light reflectivity of the particle surface at the curing wavelength. Larger particle sizes are preferred because the UV light can then penetrate between particles. The average particle size is preferably limited to approximately half of the print layer thickness. A thin print layer thickness is desired to enable UV light penetration of the entire layer. These constraints need to be balanced. Typical parameters, for example, are a layer thickness of 20 microns and a maximum or average particle size of 10 microns.

Some variations add metal-organic monomers and/or metal salts to increase the volume fraction of metal in the starting resin. For example, nickel acrylate is a photoreactive metal-organic monomer (and it is a metal salt) that can be converted to nickel metal by a heat treatment. Nickel methacrylate is a similar metal-organic monomer with a lower metal yield than nickel acrylate (nickel methacrylate contains 34.5 wt % Ni while nickel acrylate contains 41.3 wt % Ni). As another example, copper sulfate and/or copper nitrate (copper salts) can be heated to decompose into copper metal while also providing a reactive processing atmosphere from the evolution of sulfur-containing or nitrogen-containing gaseous byproducts. Some or all of a selected organic photocurable monomer may be replaced with a metal-organic monomer and/or a metal salt, thereby increasing the metal yield, without necessarily increasing viscosity or decreasing cure depth.

Nickel or copper may be introduced via metal organic compounds other than acrylates, alkyl acrylates, or salts. Other metals (besides Ni and Cu) may also be introduced as acrylates or alkyl acrylates, metal organic compounds other than acrylates or alkyl acrylates, or metal salts into the resin. In general, the starting resin may contain a metal selected from the group consisting of Ni, Co, Fe, Cu, Mn, V, Cr, Ti, Al, Zn, Y, Zr, Nb, Mo, Ru, Rh, Pd, Ag, Cd, La, Hf, Ta, W, Re, Os, Ir, Pt, La, Ce, Pr, Nd, Sm, Eu, Gd, Tb, Dy, Ho, Er, Tm, Yb, Lu, and combinations thereof The selected metals and metal alloys preferably include metals that do not oxidize easily and/or metals that can be reduced again easily if they have oxidized. In some embodiments, the selected metal has a reduction potential greater than (in magnitude, i.e. more negative than) −1 V versus a hydrogen electrode, calculated as standard electrode potential at 25° C. and a pressure of 1 atmosphere (atm) for the half reaction in the direction of reduction. In various embodiments, the selected metal has a reduction potential of about, or at least about (in magnitude), −0.1 V, −0.2 V, −0.5 V, −0.8 V, −1.0 V, −1.2 V, −1.5 V, −2.0 V, −2.5 V, or −3.0 V. The preferred metal reduction potential may depend on the processing atmosphere and overall compositions.

During the conversion from metal-polymer parts to metal via heat treatment, an oxidative environment typically cannot be avoided. For example, there is often oxygen in the starting materials (such as metal acrylates or metal salts) that is set free during heat treatment. The oxygen may be beneficial in removing carbonaceous materials by oxidation reactions, yet may be disadvantageous with respect to metal oxidation. In certain cases, a metal oxide is desired to be included in the final part.

To obtain final metallic parts, residual organic and carbonaceous compounds may be removed either in reductive or oxidative atmospheres at elevated temperatures. In a reductive environment such as in hydrogen flow, organic components are reduced to generate volatile hydrocarbons, and the metallic components typically remain in metal form (although some metal hydride or metal carbide may form). In an oxidative environment such as in air, organic components are oxidized to generate CO and $CO_2$, and the metallic components may be oxidized to metal oxides. To reduce the metal oxides to metal again, an oxidative heat treatment may be followed by a reductive heat treatment. Some metal oxides such as nickel oxide can be easily reduced to elemental metal such as metallic nickel by heating at temperatures above 600° C. in a reducing atmosphere, such as flowing hydrogen. Similar behavior is known for Co, Cu, and Fe, as shown on an Ellingham Diagram (see Ellingham, "Reducibility of oxides and sulphides in metallurgical processes", J. Soc. Chem. Ind. (London), 63 (5): 125, 1944, which is hereby incorporated by reference).

Nickel, cobalt, copper, iron, and their alloys are preferred metals in some embodiments because these metals oxidize to some extent during the heat treatments necessary to remove the organic content and then can be readily reduced again by heat treatment and/or sintering in a reducing atmosphere, such as flowing $H_2$ or an inert gas (e.g., $N_2$ or Ar) carrying a small fraction of $H_2$, such as 4 vol % $H_2$. Slow heating at 1° C./min to 800° C. in either a reducing or an oxidizing atmosphere may be sufficient to remove all organic matter in the resin. By optimizing the resin formulation, a faster heating rate and/or a lower temperature may be utilized. In some embodiments, part of the heat treatment is performed in an inert atmosphere, and then the partially oxidized nickel, copper, iron and/or cobalt may be reduced in a subsequent heat treatment in a reducing atmosphere.

The overall heating process may be optimized to include a sequence of heat treatments in various atmospheres such as inert, oxidative, and reducing atmospheres. One example of a heating process is (i) heating at a rate of 1° C./min to 800° C. in argon, then (ii) holding for 30 minutes at 800° C. in air or 4 vol % oxygen/argon, followed by (iii) heating at a rate of 5° C./min to 1200° C. in hydrogen/argon flow, and finally (d) holding for 4 hours in 4 vol % hydrogen/argon.

The photocurable metal-organic resin includes photocurable monomers, oligomers, or polymers that are photoreactive (e.g., UV reactive). Many functionalities may be leveraged to provide photoreactivity, such as but not limited to acrylate, methacrylate, vinyl ether, thiol, oxetane, ethynyl, epoxy, cycloaliphatic epoxy, or a combination thereof.

The photocurable metal-organic resin includes photocurable monomers, oligomers, or polymers that act as a metal binder to provide a 3D framework for the metal particles upon completion of the 3D printing. For conversion into final metallic parts, the organic binder must normally be removed. Acrylates are preferred over epoxies because acrylates provide good green strength and easy removal (debinding). Thiols may also be used, but precautions must be taken due to the sulfur content. Detailed compositions are discussed below.

In some embodiments, the photocurable metal-organic resin formulation is designed to provide multistage burn out of organic components, which can help preserve the structure of the final metallic part while completely removing the organic components. For example, a mixture of monofunctional, difunctional, trifunctional, and tetrafunctional acrylate monomers at optimized concentrations allows for a continuous slow release of volatiles at low temperature (such as less than 200° C.), creating microchannels that facilitate the release of volatiles at higher temperatures (such as higher than 450° C.). During this multistage process, metal particles slowly flow and repack themselves within the 3D framework.

In some embodiments, a composition for additive manufacturing of metals comprises photoreactive metal salts and/or metal-containing monomers, oligomers, and/or polymers. In some embodiments, a photoreactive molecule contains photoreactive functional groups such as acrylates, methacrylates, thiols, and/or unsaturated bonds C=X or C≡X wherein X is carbon, nitrogen, sulfur, oxygen, or a combination thereof. The photoreactive molecule has a backbone that may be of organic nature, i.e. containing carbon and hydrogen, or of inorganic nature such as compounds containing M-M, M-C, M-N, and/or M-O wherein M is an inorganic element such as Si, Ni, Cu, Fe, Co, Zn, Cr, Ru, W, Ti, Pt, Pd, or a combination thereof. The photoreactive molecule may have a backbone that is a combination or organic and inorganic compounds, such as a polymer in which a hydrogen atom is replaced by a silicon atom.

Exemplary photoreactive metal salts include nickel acrylate, zinc acrylate, nickel methacrylate, and zinc methacrylate.

Exemplary photoreactive organometallic compounds include Zeise's salt: potassium trichloro(ethene)platinate(II) and/or its analogues with palladium or nickel (rather than platinum) centers; and metal-coordination complexes such as bis(cyclooctadiene)nickel(0), iron cyclooctatetraene, transition-metal fullerene complexes, or metal acetylacetonates.

Exemplary photoreactive metal-coordination monomers, oligomers, and polymers, or metal-organic frameworks, may be synthesized by reacting organic ligands with metal salts or metal hydroxides and optional crosslinkers, or by reacting ion-containing polymers with metal salts or metal hydroxides.

In some embodiments, the photocurable liquid resin contains an organometallic resin component in a concentration from about 10 vol % to about 50 vol % of the photocurable liquid resin, for example. In various embodiments, the photocurable liquid resin contains an organometallic resin component in a concentration of about 1, 2, 5, 10, 15, 20, 25, 30, 35, 40, 45, or 50 vol % of the photocurable liquid resin.

In some embodiments, the organometallic compound is selected from the group consisting of metal-organic salts, metal-organic chelates, metal-organic frameworks with one or more organic ligands, metal-coordination monomers, metal-coordination oligomers, metal-coordination polymers, and combinations thereof. The organometallic compound contains at least the first metal, and optionally additional metals. The first metal may be the same as the second metal (contained in the metal or metal alloy particles), or the first metal may be different than the second metal. The organometallic compound itself is optionally photocurable.

In some embodiments, the organometallic compound is a metal-organic salt selected from the group consisting of nickel nitrate, cobalt nitrate, copper nitrate, iron nitrate, aluminum nitrate, nickel chloride, cobalt chloride, copper chloride, iron chloride, aluminum chloride, nickel bromide, cobalt bromide, copper bromide, iron bromide, aluminum bromide, and combinations thereof.

In some embodiments, the organometallic compound is a metal-organic chelate selected from the group consisting of nickel acrylate, cobalt acrylate, copper acrylate, iron acrylate, zinc acrylate, aluminum acrylate, nickel methacrylate, cobalt methacrylate, copper methacrylate, iron methacrylate, zinc methacrylate, aluminum methacrylate, and combinations thereof.

In some embodiments, the organometallic compound contains an organic component selected from the group consisting of acrylic acid, poly(ethylene-co-methacrylic acid), poly(ethylene-co-acrylic acid), 1,6-hexanediol diacrylate, pentaerythritol triacrylate, pentaerythritol tetraacrylate, pentaerythritol tetrakis(3-mercaptopropionate), trimethylolpropane tris(3-mercaptopropionate), and combinations thereof. In these or other embodiments, the organometallic compound contains a metal or metal-containing component selected from the group consisting of zinc, nickel, cobalt, copper, iron, aluminum, zinc hydroxide, nickel hydroxide, cobalt hydroxide, copper hydroxide, iron hydroxide, aluminum hydroxide, and combinations thereof.

One exemplary photoreactive molecule has the following structure:

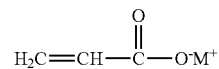

wherein M is selected from the group consisting of Ni, Co, Fe, Cu, Mn, V, Cr, Ti, Al, Zn, Y, Zr, Nb, Mo, Ru, Rh, Pd, Ag, Cd, La, Hf, Ta, W, Re, Os, Ir, Pt, La, Ce, Pr, Nd, Sm, Eu, Gd, Tb, Dy, Ho, Er, Tm, Yb, Lu, and combinations thereof.

Another exemplary photoreactive molecule has the following structure:

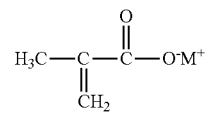

wherein M is selected from the group consisting of Ni, Co, Fe, Cu, Mn, V, Cr, Ti, Al, Zn, Y, Zr, Nb, Mo, Ru, Rh, Pd, Ag, Cd, La, Hf, Ta, W, Re, Os, Ir, Pt, La, Ce, Pr, Nd, Sm, Eu, Gd, Tb, Dy, Ho, Er, Tm, Yb, Lu, and combinations thereof.

Another exemplary photoreactive molecule has the following structure:

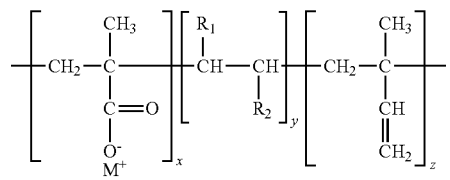

wherein x=1 to 1000, y=1 to 1000, and z=1 to 1000, and wherein M is selected from the group consisting of Ni, Co, Fe, Cu, Mn, V, Cr, Ti, Al, Zn, Y, Zr, Nb, Mo, Ru, Rh, Pd, Ag, Cd, La, Hf, Ta, W, Re, Os, Ir, Pt, La, Ce, Pr, Nd, Sm, Eu, Gd, Tb, Dy, Ho, Er, Tm, Yb, Lu, and combinations thereof.

Another exemplary photoreactive molecule has the following structure:

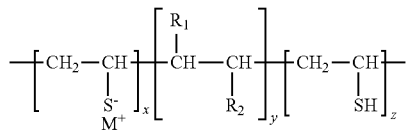

wherein x=1 to 1000, y=1 to 1000, and z=1 to 1000, and wherein M is selected from the group consisting of Ni, Co, Fe, Cu, Mn, V, Cr, Ti, Al, Zn, Y, Zr, Nb, Mo, Ru, Rh, Pd, Ag, Cd, La, Hf, Ta, W, Re, Os, Ir, Pt, La, Ce, Pr, Nd, Sm, Eu, Gd, Tb, Dy, Ho, Er, Tm, Yb, Lu, and combinations thereof.

Another exemplary photoreactive molecule has the following structure:

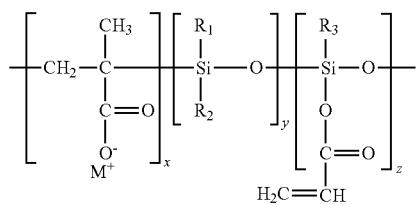

wherein x=1 to 1000, y=1 to 1000, and z=1 to 1000, and wherein M is selected from the group consisting of Ni, Co, Fe, Cu, Mn, V, Cr, Ti, Al, Zn, Y, Zr, Nb, Mo, Ru, Rh, Pd, Ag, Cd, La, Hf, Ta, W, Re, Os, Ir, Pt, La, Ce, Pr, Nd, Sm, Eu, Gd, Tb, Dy, Ho, Er, Tm, Yb, Lu, and combinations thereof.

In some embodiments, the photocurable liquid resin contains an organic resin component in a concentration from about 10 vol % to about 80 vol % of the photocurable liquid resin, for example. In various embodiments, the photocurable liquid resin contains an organic resin component in a concentration of about 1, 2, 5, 10, 15, 20, 25, 30, 40, 50, 60, 70, or 80 vol %.

In some embodiments, a composition for additive manufacturing of metals comprises organic photocurable monomers, oligomers, and polymers with photocurable functional groups such as acrylates, methacrylates, thiols, or unsaturated C=X and C≡X bonds wherein X is C, S, O, and/or N, such as vinyl, allyl, alkene, or alkynyl. These organic photocurable monomers, oligomers, and polymers do not contain metal, as distinguished from the metal-containing monomers, oligomers, and/or polymers discussed above. Compounds containing acrylate and methacrylate groups include (meth)acrylated epoxy, (meth)acrylated polyesters, (meth)acrylated urethanes, (meth)acrylated silicones, 1,6-hexanediol diacrylate, pentaerythritol triacrylate, pentaerythritol tetraacrylate, acrylic acid, methacrylic acid, 2-isocyanatoethyl acrylate, 2-isocyanatoethyl methacrylate, poly(ethylene glycol) diacrylate, and acrylate esters, for example. Compounds containing thiol groups include pentaerythritol tetrakis(3-mercaptopropionate), and trimethylolpropane tris(3-mercaptopropionate), for example. A compound containing unsaturated bonds is 1,3,5-triallyl-1,3,5-triazine-2,4,6(1H,3H,5H)-trione, for example, which includes several C=X bonds (X=C, O, and, under a certain resonance structure, N).

In some embodiments, a composition for additive manufacturing of metals comprises metal-containing particulates. A metal-containing particulate (also referred to herein as a metal particulate or a metal additive) may contain one or more metals M, wherein M is selected from the group consisting of Ni, Co, Fe, Cu, Mn, V, Cr, Ti, Al, Zn, Y, Zr, Nb, Mo, Ru, Rh, Pd, Ag, Cd, La, Hf, Ta, W, Re, Os, Ir, Pt, La, Ce, Pr, Nd, Sm, Eu, Gd, Tb, Dy, Ho, Er, Tm, Yb, Lu, and combinations thereof, or metal alloys of any of the foregoing. Note that metal-containing particulates may be included instead of, or in addition to, photoreactive metal salts or metal-containing monomers, oligomers, and/or polymers described above.

In some embodiments, metal-containing particulates contain a metal alloy selected from the group consisting of aluminum alloys, stainless steels, high-temperature steels, nickel alloys comprising Ni, Al, and Cr with more than 3 wt % Al and a Cr/Al ratio less than 4, nickel alloys comprising Ni, Al, and Cr with more than 10 wt % Cr and a Cr/Al ratio greater than 4, and combinations thereof.

The average particle size of a metal particulate may be from about 0.1 microns to about 500 microns, such as from about 0.2 microns to about 30 microns, or from about 0.5 microns to about 20 microns, or from about 1 micron to about 100 microns. In various embodiments, the metal particulate has a minimum particle size, a D10 particle size, an average particle size, a D50 particle size, a maximum particle size, or a D90 particle size that is about, at least about, or at most about 0.1, 0.2, 0.5, 1, 2, 5, 10, 15, 20, 25, 30, 40, 50, 75, 100, 150, 200, 250, 300, 350, 400, 450, or 500 microns. The metal particulates may be of various shapes, such as spheres, platelets, rods, whiskers, irregular shapes, random shapes, etc. In some embodiments, the metal particulates have an aspect ratio greater than 1.

Metal or metal alloy particles may be solid, hollow, or a combination thereof. These particles can be made by any means including, for example, gas atomization, thermal spray, cold spray, grinding, milling, cryomilling, wire explosion, laser ablation, electrical discharge, sputtering, vapor deposition, or other techniques known in the art.

In some embodiments, the metal particulates (metal or metal alloy particles) are surface-polished to provide a UV-reflective surface. In other embodiments, or additionally, the metal or metal alloy particles are coated with a UV-reflective coating that has a surface composition different than the composition of the metal or metal alloy particles. The surface composition of the UV-reflective coating may include a metal selected from the group consisting of Ni, Cu, Co, Fe, and combinations thereof, for example. The UV-reflective coating may be a pure metal or a metal alloy. The thickness of the UV-reflective coating may be from about 100 nanometers to about 2000 nanometers, for example.

In certain embodiments, the composition for additive manufacturing of metals comprises from about 5 vol % to about 60 vol % of metal or metal alloy particles, wherein the metal or metal alloy particles are characterized by an average effective diameter from about 0.5 microns to about 20 microns, wherein the thickness of the UV-reflective coating is from about 100 nanometers to about 2000 nanometers, and wherein the surface composition of the UV-reflective coating includes a metal selected from the group consisting of Ni, Cu, Co, Fe, and combinations thereof.

In some embodiments, a composition for additive manufacturing of metals comprises one or more solvents to dissolve organometallic compounds, and/or to dissolve or suspend metal particulates, and/or to reduce viscosity of the resin. Exemplary solvents include, but are not limited to, isopropyl alcohol, ethanol, methoxyethanol, dimethylformamide, ethyl acetate, dichloromethane, dimethylsulfoxide, acetonitrile, chloroform, tetrahydrofuran, or combinations thereof. The solvent may be present from about 1 vol % to about 50 vol % of the resin composition, for example.

In some embodiments, a composition for additive manufacturing of metals comprises surfactants to mitigate agglomeration of metal particles, act as dispersants, and/or reduce viscosity of the resin. When present, surfactants may be from about 0.01 vol % to about 5 vol % of the resin composition.

In some embodiments, a composition for additive manufacturing of metals comprises a photoreflective (i.e., light-reflective) material that is reflective at one or more light wavelengths from 10 nm to 800 nm, and is preferably reflective at one or more light wavelengths from 200 nm to 500 nm (e.g., 365 nm and/or 405 nm). The addition of a photoreflective material maximizes internal reflection and improves cure depth, thereby enhancing printability. Exemplary photoreflective materials include, but are not limited to, aluminum, copper, silver, gold, calcium, indium, potassium, lithium, magnesium, sodium, rubidium, zinc, alumina trihydrate ($Al_2O_3 \cdot 3H_2O$), or combinations thereof. When present, the photoreflective material may be at a concentration from about 0.1 vol % to about 5 vol %, for example. Some compositions comprise from about 0.01 vol % to about 25 vol % of a photoreflector containing, for example, a metal selected from the group consisting of Al, Co, Cu, Ag, Au, Ca, In, K, Li, Mg, Na, Rb, Zn, and combinations thereof.

In some embodiments, a composition for additive manufacturing of metals comprises one or more photoinitiators that generate free radicals under exposure to light of the selected wavelength, e.g. from about 200 nm to about 500 nm, to initiate polymerization. Examples of photoinitiators include, but are not limited to, peroxides; thioxanthones; 2,2-dimethoxy-2-phenylacetophenone; 2-hydroxy-2-methylpropiophenone; camphorquinone; bis(2,4,6-trimethylbenzoyl)-phenylphosphineoxide; diphenyl(2,4,6-trimethylbenzoyl)phosphine oxide; benzophenone; azobisisobutyronitrile; benzoyl peroxide; or combinations thereof. Combinations of different types of photoinitiators may be used in the polymerization process, which may result in different reaction rates. More than one photoinitiator may be included to allow multi-wavelength curing. The photoinitiator may be present from about 0.1 vol % to about 5 vol %, for example.

In some embodiments, a composition for additive manufacturing of metals comprises a free-radical thermal initiator that generates free radicals under elevated temperature conditions, such as about 40° C., 50° C., 75° C., 100° C., 150° C., or 200° C. Exemplary free-radical thermal initiators include, but are not limited to, benzophenone, azobisisobutyronitrile, peroxides, benzoyl peroxide, dicumyl peroxide, or combinations thereof. The free-radical thermal initiator, when present, may be up to about 10 vol % of the resin composition. A combination of different types of thermal initiators may be used in the polymerization process, which may result in different reaction rates. In some embodiments, the addition of a free-radical thermal initiator allows for multiple-mechanism curing in the formulation, such as both UV curing and thermal curing.

In some embodiments, a composition for additive manufacturing of metals comprises a catalyst. The catalyst may be a polymerization or oligomerization catalyst, a crosslinking catalyst, a metal-reduction catalyst, or an organic functional-group addition catalyst, for example. An exemplary catalyst is a platinum complex catalyst for vinyl addition. When present, the catalyst may be from about 0.001 vol % to about 1 vol % of the resin composition, for example.

In some embodiments, a composition for additive manufacturing of metals comprises a free-radical inhibitor (antioxidant) added in a sufficient amount to the resin composition to inhibit unwanted polymerization of regions outside the desired printing area. A free-radical inhibitor can increase the resolution of the desired part as well as improve the shelf life of the resin. Examples of free-radical inhibitors include, but are not limited to, hydroquinone; methylhydroquinone; ethylhydroquinone; methoxyhydroquinone; ethoxyhydroquinone; monomethylether hydroquinone; propylhydroquinone; propoxyhydroquinone; tert-butylhydroquinone; N-nitroso-N-phenylhydroxylamine aluminum salt; n-butylhydroquinone; or combinations thereof. A free-radical inhibitor, when present, may be up to about 1 vol % of the resin composition, for example.

In some embodiments, a composition for additive manufacturing of metals comprises a cationic photoinitiator or photoacid generator, such as an onium salt containing sulphonium, iodonium, and ferrocenium cations paired with a non-nucleophilic anion. The onium salt creates Brønsted acids under light exposure by cleavage of the sulphonium, iodonium, and ferrocenium cation of the onium salt. Cationic photoinitiators are typically active under wavelengths from 200 nm to 350 nm. However, photoinitiators active at higher wavelengths may be used in some embodiments. The cationic photoinitiator, when present, may be up to about 10 vol % of the resin composition, for example. Examples of cationic photoinitiators include, but are not limited to, sulfonium-iodonium-ferrocenium salts or analogues thereof, cyclopentacienylcumene iron hexafluorophosphate, diphenyliodonium phosphate, triarylsulfonium hexafluoroantimonate, or combinations thereof. Combinations of different cationic photoinitiators, or combinations of a cationic photoinitiator with another type of photoinitiator, may be employed.

In some embodiments, a composition for additive manufacturing of metals comprises a hydrogen donor to assist in the generation of a Brønsted acid from a cation and/or in acceleration of anionic photoinitiator reactions. Examples of hydrogen donors include, but are not limited to, tertiary amines (which are very reactive), alcohols, ethers, esters, water, or combinations thereof. The hydrogen donor, when present, may be up to about 10 vol % of the resin composition, for example.

In some embodiments, a composition for additive manufacturing of metals comprises a UV sensitizer to enable initiation of a long UV-wavelength reaction with a photoinitiator that typically absorbs at shorter wavelengths. For example, a typical cationic photoinitiators is limited to absorption at approximately 355 nm. UV sensitizers interact with UV light at longer wavelengths, such as about 400 nm, and then interact with the photoinitiator to create free radicals and/or Brønsted acids. A UV sensitizer forms an excited triplet state under UV light absorption, and then, through electron or energy transfer, reacts with a photoinitiator to generate free radicals and/or Brønsted acids, thereby initiating photopolymerizaton. Examples of UV sensitizers include, but are not limited to, dibutoxyanthracene, diethoxyanthracene, 1-chloro-4-propoxythioxanthone, 2-i sopropylthioxanthone, 4-isopropylthioxanthone, or combinations thereof. The UV sensitizer, when present, may be up to about 10 vol % of the resin composition, for example.

In some embodiments, a composition for additive manufacturing of metals comprises one or more 3D-printing resolution agents—such as UV absorbers, fluorescents, dyes, or optical brighteners—that absorb light at a first wavelength and convert light energy either into thermal energy or into radiation at a second, longer wavelength. The use of UV absorbers, fluorescents, dyes, and/or optical brighteners can improve print quality and resolution by containing the curing to the desired laser or light exposure region laterally and vertically in the print bath. Examples of UV absorbers, fluorescents, dyes, or optical brighteners include, but are not limited to, 2-(2-hydroxyphenyl)-benzotriazole; 2-hydroxyphenyl-benzophenones; 2-hydroxyphenyl-s-triazines; 2,2'-(2,5-thiophenediyl)bis(5-tert-butylbenzoxazole); ethenediyl)bis(4,1-phenylene)bisbenzoxazole; tartrazine; bixin; or combinations thereof. The UV absorbers, fluorescents, dyes, or optical brighteners, when present, may be up to about 10 vol % of the resin composition, for example.

In some embodiments, a composition for additive manufacturing of metals comprises one or more sinter aids (also known as sintering aids). Exemplary sinter aids include, but are not limited to, aluminum oxide (alumina), titanium dioxide, copper oxide, magnesium oxide, manganese oxide, silicon carbide, zirconium hydride, or combinations thereof. When present, the sinter aid may be from about 0.01 vol % to about 25 vol %, for example.

In some embodiments, a composition for additive manufacturing of metals comprises one or more additional photocurable components, such as components containing a functional group selected from aliphatic ether, cyclic ether, vinyl ether, epoxy, cycloaliphatic epoxy, oxetane, or a combination thereof. The additional photocurable component may contain combinations of different functional groups. In some embodiments, cycloaliphatic epoxy and/or oxetane are utilized. Examples of additional photocurable components include, but are not limited to, epoxy-functional dimethylpolysiloxane; epoxycyclohexylethylmethylsiloxane-dimethylsiloxane; bis(3,4-epoxycyclohexylmethyl) adipate; 3,4-epoxycyclohexylmethyl-3',4'-epoxycyclohexane carboxylate; 3-ethyl-3-hydroxymethyl oxetane; or combinations thereof. The additional photocurable component, when present, may be up to about 90 vol % of the resin composition, for example.

In certain embodiments, a resin composition contains 30-50 vol % particles with (a) an average diameter from 1 to 10 microns and (b) a composition that is at least 50 wt % nickel. Preferred particle compositions include nickel alloys Ni-20Cr, Ni-15Cr-24Fe, Monel 400, Monel K-500, Inconel 718, Inconel 625, Ni-20Fe, Fe-9Si-6Al, and high γ' nickel superalloys such as CM 247 or MAR-M-24. The resin composition further contains 0-50 vol % metal salts, preferably nickel acrylate, zinc acrylate, and/or iron acrylate, and 0-50 vol % of an acrylate-based organic monomer that does not contain metal. The total monomer components (metal salts plus organic monomers) are present from 1 vol % to 70 vol %. The preferred organic monomers are 1,6-hexanediol diacrylate, pentaerythritol triacrylate, pentaerythritol tetraacrylate, or acrylic acid. The preferred resin solvents are dimethylformamide or acrylate esters. The preferred polymerization initiators are bisacylphosphine or bisacylphosphine oxide, in these certain embodiments.

In certain embodiments, a resin composition contains 30-50 vol % particles with (a) an average diameter from 1 to 10 microns and (b) a composition that is at least 50 wt % cobalt, copper, iron, zinc, palladium, silver, gold, or a combination thereof. The resin composition further contains 0-50 vol % metal salts, and 0-50 vol % of an acrylate-based organic monomer that does not contain metal. The total monomer components (metal salts plus organic monomers) are present from 1 vol % to 70 vol %.

In certain embodiments, a resin composition does not contain cobalt. In certain embodiments, a resin composition does not contain tungsten.

Some embodiments provide a composition for additive manufacturing (3D printing) of metals, the composition comprising:
(a) from about 10 vol % to about 70 vol % of a photocurable liquid resin (in monomer, oligomer, and/or polymer form);
(b) from about 10 vol % to about 70 vol % of metal or metal alloy particles, wherein the metal or metal alloy particles are optionally configured with a photoreflective surface (e.g., a UV-reflective surface); and
(c) from about 0.01 vol % to about 10 vol % of a photoinitiator.

Some embodiments provide a composition for additive manufacturing (3D printing) of metals, the composition comprising:
(a) from about 1 vol % to about 70 vol % of a photocurable liquid resin;
(b) from about 0.1 vol % to about 98 vol % of an organometallic compound containing a metal; and
(c) from about 0.01 vol % to about 10 vol % of a photoinitiator.

In certain embodiments, the organometallic compound is not nickel acrylate. In certain embodiments, the organometallic compound is not cobalt acrylate.

The compositions disclosed herein may be 3D-printed using many different methods. In some variations, the compositions may be directly 3D-printed and converted to free-form metal matrix composite structures.

Typically, a resin composition is conveyed (printed) to a region of interest, such as via stereolithography, binder jetting, resin jetting with fiber placement, polyjetting, or extrusion printing, either followed by polymerization or with polymerization taking place simultaneously with the printing. Preferably, the polymerizing and 3D printing steps are performed simultaneously, at a desired location (e.g., a layer) within a part. In some embodiments, the polymerizing and 3D printing steps are performed semi-simultaneously, in which multiple steps are performed overall while at each step, some amount of polymerizing and some amount of 3D printing takes place. In some embodiments, a resin is first polymerized, followed by 3D printing of the already-made polymer (e.g., a thermoplastic material).

In stereolithography, layers of resin composition are cured from the top or bottom using UV-laser rastering, projection micro-stereolithography, digital light projection, or liquid crystal device projection, for example. Smaller metal particulate sizes are preferred, when metal particulates are included in the resin, since the particulate size often limits the resolution, depending on material choice.

Generally speaking, "jetting" of a material means that droplets of a build material are selectively deposited onto a build bed to develop a three-dimensional object. Jetting can be carried out by liquid deposition, vapor deposition, or liquid-vapor mist deposition, for example, via spraying (such as via a nozzle in communication with a material under pressure), impingement (such as via a tube or pipe in communication with a material that is pumped), or other means.

In resin jetting, a layer of liquid resin is jetted on selected locations and cured such as via UV light or thermally. This process is similar to conventional binder jetting methods, but instead of a binder, a resin is used. An optional metal particulate may initially be spread out on a substrate or on a region of resin, if desired. After an initial step of resin jetting, another layer is generated via resin jetting and curing. This process may be repeated many times for large parts.

In resin jetting with fiber placement, solid metals in the form of long or short particulates are placed in the preferred location and aligned in the preferred direction. Subsequently, liquid resin is jetted in selected locations and cured. The process is repeated layer-by-layer to build a part. Resin jetting with fiber (particle) placement enables printing of parts with high volume fraction (such as 30-60 vol %) of aligned fibers or metal particulates, resulting in improved mechanical properties for the final metallic structure (following pyrolysis).

In polyjetting, a mixture of liquid resin (and optionally solid metal particulates) is jetted and written into the desired pattern. As the mixture is dispensed, it is exposed to UV light such as a laser, LED, or plasma sources, and cured into a polymer. Multiple mixtures are able to be dispensed through different nozzles, allowing for more than one composition to be utilized simultaneously. This results in tailored mechanical properties for the final metallic structure (following pyrolysis).

In extrusion printing, the liquid resin composition is squeezed through a micro-nozzle, or multiple micro-nozzles, and cured via UV light. One advantage is that high-aspect-ratio metal particulates can be aligned with the extrusion process. Alignment generally improves mechanical properties in the aligned direction.

In some cases where non-spherical metal particles are dispersed in a liquid resin, it can be beneficial to apply a magnetic field during the printing process to align the non-spherical particles, such as rods, whiskers, plates, etc. in a preferred direction.

After a part is 3D printed using any of the above methods, or another method, the part may be post-cured. An optional thermal post-cure of the 3D polymer is performed after the 3D printing but prior to the pyrolysis to produce the metallic structure. A post-cure step may be employed to crosslink unreacted functional groups, for example. Post-curing may be accomplished by additional UV exposure and/or a thermal post-cure at elevated temperatures (such as 60-500° C.) in an oven for about 10 minutes to about 8 hours. When a thermal post-cure is to be done, it can be beneficial to include a thermal initiator in the initial 3D-printing composition, to facilitate later thermal curing.

In some embodiments, the curing or conversion of the resin composition includes crosslinking. A crosslink is a bond that links one polymer chain to another. Crosslink bonds can be covalent bonds or ionic bonds. When polymer chains are linked together by crosslinks, they lose some of their ability to move as individual polymer chains. Crosslinks are the characteristic property of thermosetting plastic materials. In most cases, crosslinking is irreversible, unless ionic bonds are employed in reversible crosslinks.

Some embodiments provide a method of making a metallic component, the method comprising:

(a) obtaining a starting formulation comprising a photocurable liquid resin, metal or metal alloy particles, and a photoinitiator;
(b) 3D printing the starting formulation using stereolithography, digital light projection, or another UV-based technique, to form an intermediate 3D-printed structure;
(c) thermally treating the intermediate 3D-printed structure to remove at least a portion of organic matter from the intermediate 3D-printed structure, thereby forming a pyrolyzed 3D-printed structure; and
(d) recovering the pyrolyzed 3D-printed structure as a metallic component.

Some embodiments provide a method of making a metallic component, the method comprising:

(a) obtaining a starting formulation comprising a photocurable liquid resin, an organometallic compound containing a first metal, metal or metal alloy particles containing a second metal, and a photoinitiator, wherein the first metal is the same or different than the second metal;
(b) 3D printing the starting formulation using stereolithography, digital light projection, or another UV-based technique, to form an intermediate 3D-printed structure;
(c) thermally treating the intermediate 3D-printed structure to remove at least a portion of organic matter from the intermediate 3D-printed structure, thereby forming a pyrolyzed 3D-printed structure; and
(d) recovering the pyrolyzed 3D-printed structure as a metallic component.

Some variations of the invention provide a 3D-printed intermediate metallic component, the 3D-printed intermediate metallic component comprising:

(a) from about 1 vol % to about 70 vol % of a photocured resin;
(b) from about 0.1 vol % to about 98 vol % of an organometallic compound containing a first metal; and
(c) from about 1 vol % to about 70 vol % of a metal or metal alloy, wherein the metal or metal alloy contains a second metal.

Nickel-, copper-, iron- and/or cobalt-coated metal particles facilitate reduction and sintering. Nickel, copper, iron and cobalt oxide can be easily reduced by heating in a reducing atmosphere, such as flowing hydrogen or an inert gas (e.g., nitrogen or argon) with a small fraction such as 4 vol % hydrogen. If the process is intended to be used to 3D-print metal alloys that form oxide layers, it is beneficial to first coat the alloy particles with nickel, copper, iron, and/or cobalt. Alloy particles that benefit from such a protective coating include aluminum alloys that form an $Al_2O_3$ scale on oxidation, nickel alloys with more than 3 wt % Al and a Cr/Al ratio less than 4, certain steels, alloys that form a $Cr_2O_3$ scale on oxidation (such as stainless steels), nickel alloys with more than 10 wt % Cr and a Cr/Al ratio greater than 4, and alloys that form a $SiO_2$ scale on oxidation. Once $Al_2O_3$, $Cr_2O_3$, and/or $SiO_2$ scales form on the metal alloy particles, subsequent sintering is inhibited. It is much more difficult to reduce these oxides compared to NiO, CuO, CoO, and FeO, as can be understood from an Ellingham Diagram.

A nickel, copper, iron, and/or cobalt coating can protect the underlying particle from oxidation if the coating thickness is tailored to the heat treatment necessary to remove the organic resin. Typically, slow heating at 1° C./min to 800° C. in air is sufficient to remove all organic matter in the resin. By optimizing the resin, a faster heating rate and/or a lower temperature may be sufficient, or part of the heat treatment may be performed in inert atmosphere. A nickel, copper, iron and/or, cobalt coating of 100 nm to 1000 nm is typically sufficient to protect alloy particles from oxidation during such a heat treatment. Instead of the underlying alloy, the nickel, copper, iron, and/or cobalt protective coating is oxidized during this heat treatment, wherein the thickness is chosen such that the protective coating is not fully oxidized so that oxygen cannot diffuse to the underlying metal alloy. The partially oxidized nickel, copper, iron, and/or cobalt protective coating may then be reduced by a heat treatment in a reducing atmosphere. This could be a separate heat treatment, for example 2 hours at 800° C. in argon with 4 vol % hydrogen, or the reduction could be part of the sintering heat treatment, such as heating at 1200° C. for 4 hours in argon with 4% hydrogen with a slow heating ramp at 3° C./min to start reduction of the oxide during ramp-up.

Several scalable coating processes for nickel, copper, iron, and/or cobalt are available. One cost-efficient technique is electroless plating. Other techniques include electroplating (e.g. barrel plating) and chemical vapor deposition. A thin (e.g., 0.1-1 microns) nickel, copper, iron, and/or cobalt protective coating may be deposited on the alloy particles. The alloy particles may then be added to the resin and a part is 3D-printed. The part is then heated slowly in air to remove the organic resin constituents. During this process, the coating is oxidized, but protects the underlying particles from oxidation. Subsequently, the oxide is reduced by heating the part in a reducing atmosphere. Once the oxide is reduced and all particles are covered with a metallic surface again, sintering the particles is facilitated.

During the sintering heat treatment or an additional heat treatment, the coating and particles are interdiffused to form the final alloy. The composition of the alloy particles may be adjusted to account for the addition of a protective coating and subsequent interdiffusion. For example, if the target composition of the 3D-printed part is a nickel alloy with 16 wt % Cr and 5 wt % Al to provide good oxidation resistance with an $Al_2O_3$ scale and good mechanical properties, powder may be specified of a composition with a slightly higher Cr and Al content and coated with nickel so that the composition of the nickel-coated powder is Ni-16Cr-5Al.

The direct, near-net-shape conversion of a 3D-printed resin, or a 3D-printed intermediate metallic component, to a metallic structure may be achieved by pyrolysis or other thermal treatment, such as (but not limited to) sintering, annealing, or calcination. Typically, the thermal treatment is based on heating the 3D-printed intermediate structure for an extended period of time (such as from 10 minutes to 1 week) under various inert or reactive atmospheres.

Thermal treatment may be done for an extended period of time under various inert or reactive atmospheres, including but not limited to $N_2$, Ar, He, air, $CO_2$, CO, $H_2$, $CH_4$, $C_2H_6$, $C_2H_4$, $NH_3$, or a combination thereof. Treatment pressures may vary from about 1 atm to about 20 atm, for example. Vacuum pyrolysis may also be employed, in which the treatment pressure is less than 1 atm, again under various atmospheres as noted above.

The pyrolysis or other thermal treatment may include heating at a heating rate of 0.1 C/min to 20° C./min from ambient temperature to an elevated temperature from about 500° C. to about 1500° C., such as from about 800° C. to about 1300° C., or at multiple different elevated temperatures.

Slow heating rates are preferred to enable evolving gases to escape, thereby minimizing porosity in the final part. When porosity is desired, higher heating rates (e.g., higher than 20° C./min) may be employed. The pyrolysis or other thermal treatment may also include dwelling at the elevated temperature (e.g., 500° C.) for at least 1, 5, 10, 15, 30, or 60 minutes, for example. Following pyrolysis, the material may be cooled at a cooling rate of −0.1° C./min to −20° C./min, back to ambient temperature. In some embodiments, faster cooling (e.g., at least −10° C./min) is desired to freeze-in a desired microstructure, for example.

The thermal treatment is preferably performed following polymerization and any (optional) thermal post-cure of the 3D-printed polymer. In certain embodiments, the thermal treatment is combined (i.e., overlaps in time and/or temperature) with polymerization, thermal post-cure, or both. It will also be recognized that even when a sequential operation is intended, some amount of organic compound removal and metal formation may occur prior to a planned step of thermal treatment, as a result of the intrinsic kinetics and thermodynamics of the reaction system.

In some embodiments, a reactive thermal treatment is performed, in which the gas that is initially present is reactive toward the initial polymer, the final metallic material, or both of these. When the gas is reactive, it may react with a component and cause it to leave the material. Alternatively, or additionally, the gas may react with a component and remain with the base material. It is also possible for the gas to react and form products, some of which depart from the material while the rest remains with the material. Reactive gases may be selected from $O_2$, $O_3$, air, CO, $CO_2$, $H_2$, $H_2O$, $CH_4$, $SO_2$, $H_2S$, $NH_3$, NO, $NO_2$, and $N_2O$, and so on. The maximum temperature for reactive thermal treatment may be, for example, about 500° C. to about 2000° C. The system pressure may also be adjusted to influence the gas atmosphere.

During the thermal treatment, whether an inert or reactive thermal treatment technique is employed, gases escape. Gases are formed during the conversion of starting resin to the metallic structure, by decomposition reactions of the polymer and other materials present. The escaping gases or vapors may include (but are by no means limited to) $CH_4$, $H_2$, CO, $CO_2$, $H_2O$, $SO_2$, $H_2S$, $CH_3S$, etc.

The final metallic structure may be characterized by an actual density that is at least 50% of theoretical density, or at least 75% of theoretical density, or at least 95% of theoretical density. By "theoretical density" it is meant the density of the material itself, calculated in the absence of porous voids. For example a metallic structure with absolute density of 8.1 $g/cm^3$, fabricated from a base material with inherent (bulk) density of 9.0 $g/cm^3$, exhibits 8.1/9.0=90% of theoretical density. In certain embodiments, without limitation, the metallic structure is a fully dense monolith, which means that the metallic structure has at least 99% (e.g., essentially 100%) of theoretical density associated with a part or continuous region of material. The absolute density in $g/cm^3$ will vary, depending on the selection of base metals; an exemplary range is about 3 $g/cm^3$ to about 20 $g/cm^3$.

In some cases, highly porous metallic structures are desirable, for example as scaffolds, catalytic structures, or energy absorbers. By reducing the amount of metal in the resin, the porosity can be increased. Addition of metal salts can facilitate conversion of a photocured polymer part containing a small volume fraction (e.g., about 3-30 vol %) of solid metal particles, by connecting the particles and preventing loss of shape on pyrolysis.

Optionally, porous metallic parts may be backfilled with a second material for infiltration and densification through processes such as vacuum infiltration, chemical vapor deposition, or dip coating. The infiltrated material may include ceramics (such as carbides, oxides, or nitrides, e.g., SiC, ZrC, TiN, or $Al_2O_3$), thermoset polymers (such as epoxies or urethanes), thermoplastic polymers (such as polyethylene, polycarbonate, or thermoplastic urethanes), and/or metals (such as Al, Ti, Ni, Fe, or alloys thereof).

In some embodiments, metal-polymer composite structures are desired, for examples as electronic parts, or strong and lightweight exterior components for transportation vehicles. In some embodiments, the 3D-printed intermediate structures are simply washed and used, or may undergo a low-temperature thermal post-treatment, such as at 200° C. or less, or 100° C. or less. In these embodiments, the polymer is not removed with a heat treatment, or is only partially removed, with the remaining polymer acting as a matrix phase. The metal particles can improve the mechanical properties of the polymer and also imbue other properties, such as magnetic and/or electric properties.

The overall mass loss associated with the conversion of starting resin to the metallic structure may vary widely, such as from about 1% to about 90%, e.g. about 5%, 10%, 20%, 30%, 40%, 50%, 60%, 70%, or 80%. The overall mass loss will be dictated by the starting formulation (e.g., fraction organic versus metallic) as well as by process parameters. In principle, the lost mass may be recovered separately and used for other purposes.

Associated with mass loss may be shrinkage of the resin as it converts to the metallic structure. The linear shrinkage (calculated in a single dimension, such as height of part) may be from 0% to about 60%, for example. Note that the mass loss and shrinkage are not necessarily correlated. In some embodiments with high mass loss, there is not much (if any) shrinkage. These embodiments tend to produce higher porosity and therefore lower densities. Some embodiments tend to produce lower porosity, or no porosity, and therefore higher densities (e.g., fully dense metallic materials). Finally, in some embodiments, there is little mass loss but there is still shrinkage associated with chemical reactions taking place. These embodiments also tend to produce relatively high densities.

Despite shrinkage, if any, the bulk shape (relative geometry) of the 3D-printed polymer may be preserved in the final metallic structure. That is, when shrinkage is uniform in all dimensions, the geometrical features are retained in the part: it is a scaled-down version, in all three dimensions. In some embodiments, shrinkage is approximately uniform, which means the geometrical features are basically maintained, with slight deviations. Uniform shrinkage occurs when there is no random fragmentation during conversion of the starting resin to the metallic structure, and when the reactions and gas escape are isotropic within the material.

Practically speaking, uniform shrinkage (or no shrinkage, in certain embodiments) enables the formation of parts that are "net shape" or "near net shape." "Net shape" means that the geometrical features are retained, so that manufactured parts allow final fabrication matching the intended design with little or no post-processing. "Near net shape" means that the geometrical features are not perfectly retained but require only minimal post-processing or hand-work. Both net-shape parts and near-net-shape parts require little or no machining, polishing, bonding, surface finishing, or assembly.

The 3D-printed metallic component may be characterized by a feature size less than 20, 10, 5, 1, 0.5, or 0.1 microns. A feature size refers to a minimum discernible length scale within the metallic component, which length scale is associated with a sub-structure or pattern contained within the overall structure. For some metallic components, small feature sizes are not necessary, while for other complex metallic components, small feature sizes are critical for engineering reasons.

Multiple metallic structures may be obtained and then joined, using methods such as, but not limited to, those described in commonly owned U.S. Pat. No. 15/840,146, filed on Dec. 13, 2017, which is hereby incorporated by reference. For example, multiple metallic components may be fabricated according to the above disclosure and subsequently sintered together to form a strong metal part.

Some embodiments provide a sintered structure containing a plurality of 3D-printed metallic components, each comprising (a) from about 0.1 vol % to about 99 vol % of a thermally treated (e.g., pyrolyzed) organometallic compound containing a first metal; and (b) from about 0.1 vol % to about 99 vol % of a metal or metal alloy, wherein the metal or metal alloy contains a second metal.

Some variations provide a 3D-printed metallic component, the 3D-printed metallic component comprising:
  (a) from about 0.1 vol % to about 99 vol % of a thermally treated (e.g., pyrolyzed) organometallic compound containing a first metal; and
  (b) from about 0.1 vol % to about 99 vol % of a metal or metal alloy, wherein the metal or metal alloy contains a second metal.

The thermally treated (e.g., pyrolyzed) organometallic compound may or may not contain the organic, non-metal portion of the starting organometallic compound. In some embodiments, the thermally treated organometallic compound contains essentially no organic matter. In other embodiments, the thermally treated organometallic compound contains residual organic matter, or even an intentional amount of organic matter (e.g., forming a matrix phase for a composite).

In some 3D-printed metallic components, the first metal is the same as the second metal. In other 3D-printed metallic components, the first metal is different than the second metal.

In some embodiments, the 3D-printed metallic component further contains a polymer matrix. In these or other embodiments, the 3D-printed metallic component further contains a ceramic material.

Optionally, the 3D-printed metallic component may be subjected to machining, polishing, bonding, surface finishing, assembly, coloring (e.g., with inks or dyes), stamping, and/or incorporation of other non-functional features, if desired.

Examples

These Examples describe reduction to practice in which 3D-printed metal-polymer composite parts are converted into metallic parts.

Resin preparation: An amount of 60 g of nickel particles (2.2-3.0 microns) is added into 40 g of Genesis® UV-curable resin from Tethon Corporation (Omaha, Nebr., USA), resulting in a mixture of 15 vol % of nickel. The mixture is mixed in a high-shear mixer until a uniform paste is obtained. An amount of 2.4 g of a commercially available dispersant is added and the paste is remixed to a smooth and flowable consistency.

3D printing: The resulting resin is determined to have a cure depth of 18.3 microns and a critical energy of 9.33 $mJ/cm^2$. Nickel-containing bars of various sizes are 3D-printed at 40-micron layer thickness using a ProMaker L5000 from Prodways Technologies (Les Mureaux, France).

Heat treatment: A heat treatment for the 3D-printed nickel-containing bars includes a burn-out process in argon where temperature is raised at an average of 0.5° C./min to 500° C. and held for an hour, followed by sintering in argon where temperature is raised at 5° C./min from 500° C. to 1000° C. or to 1300° C. and held for an hour.

Figure 2:
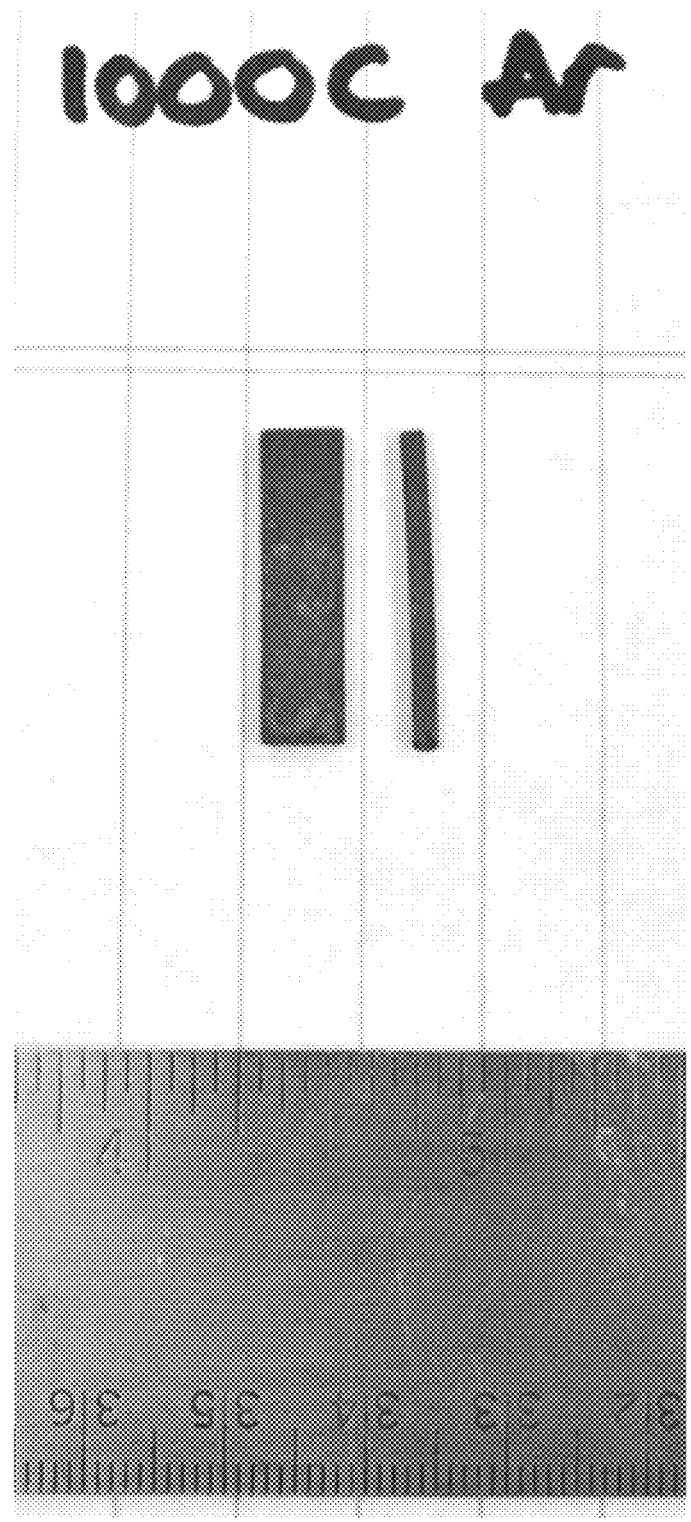
FIG. 2 is a photograph of 3D-printed nickel-containing bars following debinding and sintering in argon, in the Examples.
Figure 3:
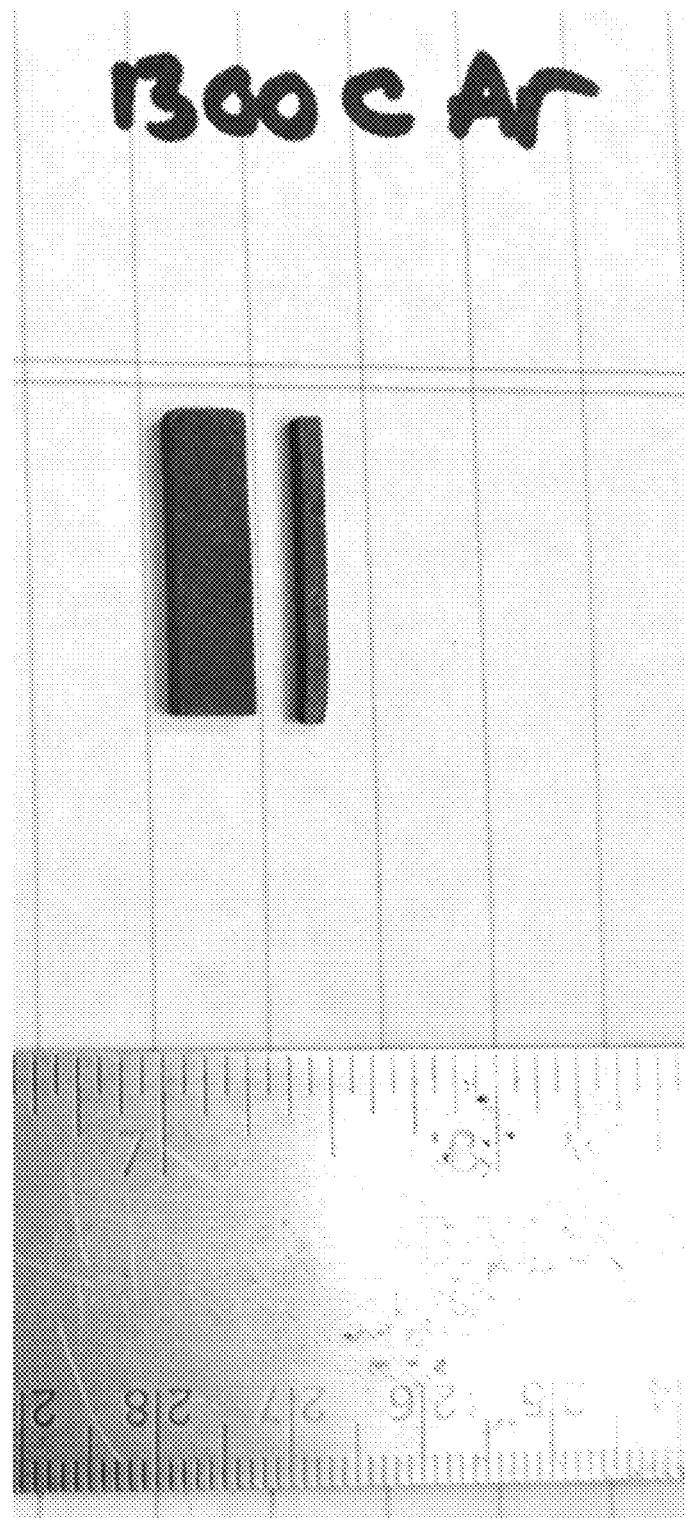
FIG. 3 is a photograph of 3D-printed nickel-containing bars following high-temperature sintering in argon at 1300° C., in the Examples.

FIG. 1 is a photograph of 3D-printed nickel-containing and polymer-containing green bars prior to debinding and sintering. FIG. 2 is a photograph of 3D-printed nickel-containing bars following debinding and sintering in argon at 1000° C. FIG. 3 is a photograph of 3D-printed nickel-containing bars following sintering in argon at 1300° C.

Figure 4:
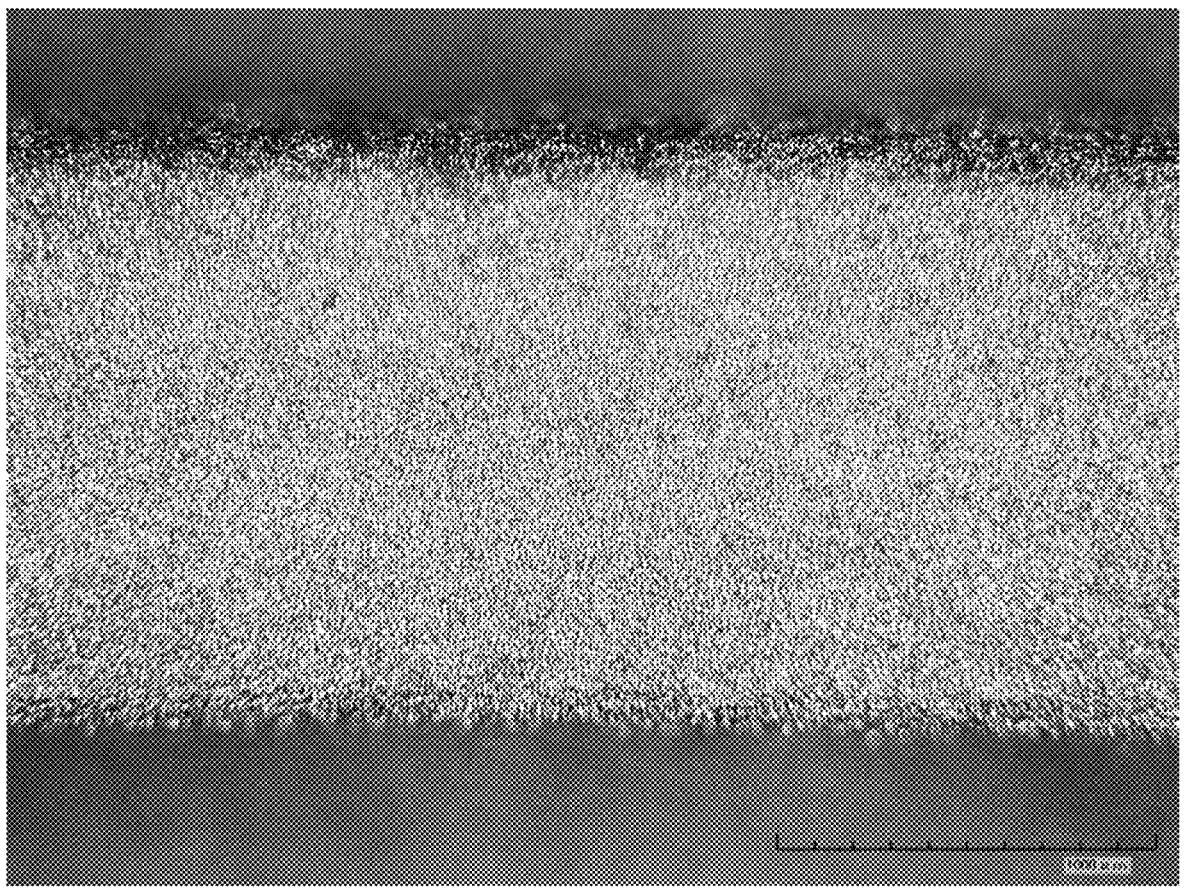
FIG. 4 is a SEM image (scale bar=1000 µm) showing that a nickel-containing 3D-printed bar exhibits a more metallic appearance after a 2-hour treatment at 1000° C. in Ar with 4 vol % $H_2$.

An additional heat treatment is performed on a nickel-containing bar, following the treatment at 1000° C. in argon. In particular, the additional heat treatment is at 1000° C. for two hours in a reducing atmosphere of argon with 4 vol % hydrogen. FIG. 4 is a scanning electron microscope (SEM) image (scale bar=1000 μm) showing that the nickel-containing bar exhibits a more metallic appearance after the 2-hour treatment at 1000° C. in Ar with 4 vol % $H_2$.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A composition for additive manufacturing of metals, said composition comprising:
   (a) from about 10 vol % to about 70 vol % of a photocurable liquid resin, wherein said photocurable liquid resin contains an organometallic resin component selected from metal-coordination monomers, oligomers, polymers, or combinations thereof;
   (b) from about 10 vol % to about 70 vol % of metal or metal alloy particles, wherein said metal or metal alloy particles are optionally configured with a photoreflective surface; and
   (c) from about 0.01 vol % to about 10 vol % of a photoinitiator.

2. The composition of claim 1, wherein said photocurable liquid resin contains one or more acrylates, methacrylates, thiols, vinyls, allyls, alkenes, alkynyls, epoxies, combinations thereof, or reaction products thereof.

3. The composition of claim 1, wherein said photocurable liquid resin contains a component containing a C=X and/or C≡X bond, wherein X is selected from C, S, O, and/or N.

4. The composition of claim 1, wherein said photocurable liquid resin contains an organic resin component selected from the group consisting of acrylic acid, poly(ethylene-co-methacrylic acid), poly(ethylene-co-acrylic acid), 1,6-hexanediol diacrylate, pentaerythritol triacrylate, pentaerythritol tetraacrylate, pentaerythritol tetrakis(3-mercaptopropionate), trimethylolpropane tris(3-mercaptopropionate), 1,3,5-triallyl-1, 3,5-triazine-2,4,6(1H, 3H,5H)-trione, and combinations thereof.

5. The composition of claim 4, wherein said organic resin component is present in a concentration from about 10 vol % to about 80 vol % of said photocurable liquid resin.

6. The composition of claim 1, wherein said organometallic resin component is present in a concentration from about 10 vol % to about 50 vol % of said photocurable liquid resin.

7. The composition of claim 1, wherein said organometallic resin component is selected from the group consisting of nickel acrylate, cobalt acrylate, copper acrylate, iron acrylate, zinc acrylate, aluminum acrylate, nickel methacrylate, cobalt methacrylate, copper methacrylate, iron methacrylate, zinc methacrylate, aluminum methacrylate, and combinations thereof.

8. The composition of claim 1, wherein said organometallic resin component is selected from the group consisting of potassium trichloro(ethene)platinate, potassium trichloro(ethene)palladiumate, potassium trichloro(ethene)nickelate, bis(cyclooctadiene)nickel(0), iron cyclooctatetraene, transition-metal fullerene complexes, metal acetylacetonates, and combinations thereof.

9. The composition of claim 1, wherein said metal or metal alloy particles are surface-polished to provide said photoreflective surface.

10. The composition of claim 1, wherein said metal or metal alloy particles are coated with a photoreflective coating that has a surface composition that is different than the composition of said metal or metal alloy particles.

11. The composition of claim 10, wherein said surface composition of said photoreflective coating includes a metal selected from the group consisting of Ni, Cu, Co, Fe, and combinations thereof.

12. The composition of claim 10, wherein the thickness of said photoreflective coating is from about 100 nanometers to about 2000 nanometers.

13. The composition of claim 1, wherein said metal or metal alloy particles are characterized by an average effective diameter from about 0.5 microns to about 20 microns.

14. The composition of claim 1, wherein said metal or metal alloy particles are characterized by an average aspect ratio greater than 1.

15. The composition of claim 10, wherein said metal or metal alloy particles are characterized by an average effective diameter from about 0.5 microns to about 20 microns, wherein the thickness of said photoreflective coating is from about 100 nanometers to about 2000 nanometers, and wherein said surface composition of said photoreflective coating includes a metal selected from the group consisting of Ni, Cu, Co, Fe, and combinations thereof.

16. The composition of claim 1, wherein said metal or metal alloy particles contain a metal selected from the group consisting of Ni, Cu, Co, Fe, Mn, V, Cr, Ti, Al, Zn, Y, Zr, Nb, Mo, Ru, Rh, Pd, Ag, Cd, La, Hf, Ta, W, Re, Os, Ir, Pt, La, Ce, Pr, Nd, Sm, Eu, Gd, Tb, Dy, Ho, Er, Tm, Yb, Lu, and combinations thereof.

17. The composition of claim 1, wherein said metal or metal alloy particles contain a metal alloy selected from the group consisting of aluminum alloys, stainless steels, high-temperature steels, nickel alloys comprising Ni, Al, and Cr with more than 3 wt % Al and a Cr/Al ratio less than 4, nickel alloys comprising Ni, Al, and Cr with more than 10 wt % Cr and a Cr/Al ratio greater than 4, and combinations thereof.

18. The composition of claim 1, wherein said photoinitiator is present in a concentration from about 0.1 vol % to about 5 vol %.

19. The composition of claim 1, wherein said photoinitiator is selected from the group consisting of 2,2-dimethoxy-2-phenylacetophenone; 2-hydroxy-2-methylpropiophenone; camphorquinone; bis(2,4,6-trimethylbenzoyl)-phenylphosphineoxide; diphenyl(2,4,6-trimethylbenzoyl) phosphine oxide; benzophenone; azobisisobutyronitrile; peroxides; benzoyl peroxide; thioxanthones; and combinations thereof.

20. The composition of claim 1, said composition further comprising from about 0.01 vol % to about 25 vol % of a UV reflector containing a metal selected from the group consisting of Al, Co, Cu, Ag, Au, Ca, In, K, Li, Mg, Na, Rb, Zn, and combinations thereof.

21. The composition of claim 1, said composition further comprising from about 1 vol % to about 50 vol % of a solvent selected from the group consisting of isopropyl alcohol, ethanol, methoxyethanol, dimethylformamide, ethyl acetate, dichloromethane, dimethylsulfoxide, acetonitrile, chloroform, tetrahydrofuran, and combinations thereof.

22. The composition of claim 1, said composition further comprising from about 0.01 vol % to about 5 vol % of a surfactant.

23. The composition of claim 1, said composition further comprising from about 0.01 vol % to about 25 vol % of a sinter aid.

24. The composition of claim 1, said composition further comprising from about 0.01 vol % to about 10 vol % of a 3D-printing resolution agent.

25. A composition for additive manufacturing of metals, said composition comprising:
(a) from about 1 vol % to about 70 vol % of a photocurable liquid resin;
(b) from about 0.1 vol % to about 98 vol % of an organometallic compound containing a first metal;
(c) from about 1 vol % to about 70 vol % of metal or metal alloy particles, wherein said metal or metal alloy particles contain a second metal; and
(d) from about 0.01 vol % to about 10 vol % of a photoinitiator.

26. The composition of claim 25, wherein said photocurable liquid resin contains one or more acrylates, methacrylates, thiols, vinyls, allyls, alkenes, alkynyls, epoxies, combinations thereof, or reaction products thereof.

27. The composition of claim 25, wherein said photocurable liquid resin contains a component containing a C=X and/or C≡X bond, wherein X is selected from C, S, O, and/or N.

28. The composition of claim 25, wherein said photocurable liquid resin contains a resin organic component selected from the group consisting of acrylic acid, poly(ethylene-co-methacrylic acid), poly(ethylene-co-acrylic acid), 1,6-hexanediol diacrylate, pentaerythritol triacrylate, pentaerythritol tetraacrylate, pentaerythritol tetrakis(3-mercaptopropionate), trimethylolpropane tris(3-mercaptopropionate), 1,3,5-triallyl-1, 3,5-triazine-2,4,6(1H, 3H,5H)-trione, and combinations thereof.

29. The composition of claim 25, wherein said organometallic compound is selected from the group consisting of metal-organic salts, metal-organic chelates, metal-organic frameworks with one or more organic ligands, metal-coordination monomers, metal-coordination oligomers, metal-coordination polymers, and combinations thereof.

30. The composition of claim 25, wherein said organometallic compound is a metal-organic salt selected from the group consisting of nickel nitrate, cobalt nitrate, copper nitrate, iron nitrate, aluminum nitrate, nickel chloride, cobalt chloride, copper chloride, iron chloride, aluminum chloride, nickel bromide, cobalt bromide, copper bromide, iron bromide, aluminum bromide, and combinations thereof.

31. The composition of claim 25, wherein said organometallic compound is a metal-organic chelate selected from the group consisting of nickel acrylate, cobalt acrylate, copper acrylate, iron acrylate, zinc acrylate, aluminum acrylate, nickel methacrylate, cobalt methacrylate, copper methacrylate, iron methacrylate, zinc methacrylate, aluminum methacrylate, and combinations thereof.

32. The composition of claim 25, wherein said organometallic compound contains an organic component selected from the group consisting of acrylic acid, poly(ethylene-co-methacrylic acid), poly(ethylene-co-acrylic acid), 1,6-hexanediol diacrylate, pentaerythritol triacrylate, pentaerythritol tetraacrylate, pentaerythritol tetrakis(3-mercaptopropionate), trimethylolpropane tris(3-mercaptopropionate), and combinations thereof.

33. The composition of claim 25, wherein said organometallic compound contains a metal-containing component selected from the group consisting of zinc, nickel, cobalt, copper, iron, aluminum, zinc hydroxide, nickel hydroxide, cobalt hydroxide, copper hydroxide, iron hydroxide, aluminum hydroxide, and combinations thereof.

34. The composition of claim 25, wherein said organometallic compound is photocurable.

35. The composition of claim 25, wherein said metal or metal alloy particles are configured with a photoreflective surface.

36. The composition of claim 35, wherein said metal or metal alloy particles are surface-polished to provide said photoreflective surface.

37. The composition of claim 35, wherein said metal or metal alloy particles are coated with a photoreflective coating that has a surface composition that is different than the composition of said metal or metal alloy particles, wherein said surface composition of said photoreflective coating optionally includes a metal selected from the group consisting of Ni, Cu, Co, Fe, and combinations thereof.

38. The composition of claim 37, wherein the thickness of said photoreflective coating is from about 100 nanometers to about 2000 nanometers.

39. The composition of claim 25, wherein said metal or metal alloy particles are characterized by an average effective diameter from about 0.5 microns to about 20 microns, and wherein said metal or metal alloy particles are optionally characterized by an average aspect ratio greater than 1.

40. The composition of claim 25, wherein said first metal is the same as said second metal.

41. The composition of claim 25, wherein said first metal is different than said second metal.

42. The composition of claim 25, wherein said metal or metal alloy particles contain a metal selected from the group consisting of Ni, Cu, Co, Fe, Mn, V, Cr, Ti, Al, Zn, Y, Zr, Nb, Mo, Ru, Rh, Pd, Ag, Cd, La, Hf, Ta, W, Re, Os, Ir, Pt, La, Ce, Pr, Nd, Sm, Eu, Gd, Tb, Dy, Ho, Er, Tm, Yb, Lu, and combinations thereof.

43. The composition of claim 25, wherein said metal or metal alloy particles contain at least 10 wt % of nickel, cobalt, copper, iron, aluminum, or a combination thereof.

44. The composition of claim 25, wherein said photoinitiator is selected from the group consisting of 2,2-dimethoxy-2-phenylacetophenone; 2-hydroxy-2-methylpropiophenone; camphorquinone; bis(2,4,6-trimethylbenzoyl)-phenylphosphineoxide; diphenyl(2,4,6-trimethylbenzoyl) phosphine oxide; benzophenone; azobisisobutyronitrile; peroxides; benzoyl peroxide; thioxanthones; and combinations thereof.

45. The composition of claim 25, said composition further comprising from about 0.01 vol % to about 25 vol % of a UV reflector containing a metal selected from the group consisting of Al, Co, Cu, Ag, Au, Ca, In, K, Li, Mg, Na, Rb, Zn, and combinations thereof.

46. The composition of claim 25, said composition further comprising from about 1 vol % to about 50 vol % of a solvent selected from the group consisting of isopropyl alcohol, ethanol, methoxyethanol, dimethylformamide, ethyl acetate, dichloromethane, dim ethyl sulfoxide, acetonitrile, chloroform, tetrahydrofuran, and combinations thereof.

47. The composition of claim 25, said composition further comprising from about 0.01 vol % to about 5 vol % of a surfactant.

48. The composition of claim 25, said composition further comprising from about 0.01 vol % to about 25 vol % of a sinter aid.

49. The composition of claim 25, said composition further comprising from about 0.01 vol % to about 10 vol % of a 3D-printing resolution agent.

* * * * *